United States Patent
Liu et al.

(10) Patent No.: US 12,318,726 B2
(45) Date of Patent: Jun. 3, 2025

(54) HARMLESS AND RESOURCEFUL TREATMENT METHOD FOR ANTIBIOTIC RESIDUE

(71) Applicant: South China University of Technology, Guangzhou (CN)

(72) Inventors: Weizhen Liu, Guangzhou (CN); Shaoyuan Liu, Guangzhou (CN); Hongyi Huang, Guangzhou (CN); Zhang Lin, Guangzhou (CN); Minlin Mao, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 18/781,947

(22) Filed: Jul. 23, 2024

(65) Prior Publication Data
US 2025/0083087 A1    Mar. 13, 2025

Related U.S. Application Data
(63) Continuation of application No. PCT/CN2023/140106, filed on Dec. 20, 2023.

(30) Foreign Application Priority Data
Sep. 11, 2023  (CN) .......................... 202311162066.6

(51) Int. Cl.
*B01D 53/00*   (2006.01)
*C01B 32/30*   (2017.01)
(Continued)

(52) U.S. Cl.
CPC ............ *B01D 53/002* (2013.01); *C01B 32/30* (2017.08); *C09K 17/14* (2013.01); *C10B 53/00* (2013.01)

(58) Field of Classification Search
CPC ...... B01D 53/002; C01B 32/30; C09K 17/14; C10B 53/00
See application file for complete search history.

(56) References Cited

FOREIGN PATENT DOCUMENTS

| CN | 112940766 A | * | 6/2021 | |
|---|---|---|---|---|
| CN | 113941314 A | * | 1/2022 | .............. B01J 20/04 |
| CN | 115138333 A | * | 10/2022 | .............. B01J 20/20 |

OTHER PUBLICATIONS

Wang bing et al., Fast pyrolysis behavior of fungus residues in a fluidized bed reactor, Chemical Industry and Engineering Progress, Mar. 2017, p. 1113-1119, vol. 36, issue 3.
(Continued)

*Primary Examiner* — Latosha Hines
(74) *Attorney, Agent, or Firm* — Hemisphere Law, PLLC; Zhigang Ma

(57) ABSTRACT

A harmless and resourceful treatment method for antibiotic residue includes steps as follows. The antibiotic residue is dried and crushed to obtain a dry powder of antibiotic residue. The dry powder of antibiotic residue is heated to a temperature of 400-800° C. to perform an isothermal pyrolysis treatment under an inert atmosphere. Condensable gas in the volatile substances released during the pyrolysis treatment is collected using a condensing device to obtain a condensable bio-oil product, non-condensable gas in the volatile substances is collected using a gas bag to obtain pyrolysis gas, and the residual substances obtained after the pyrolysis treatment are as a biochar product. The treatment method addresses the issues of incomplete degradation of the antibiotic residue, complex processes, high difficulty in resource utilization, and resource wastage in traditional treatments of the antibiotic residue, thereby achieving the goals of harmlessness and resource utilization of the antibiotic residue.

6 Claims, 1 Drawing Sheet

(51) Int. Cl.
*C09K 17/14* (2006.01)
*C10B 53/00* (2006.01)

(56) References Cited

OTHER PUBLICATIONS

Chen Guanyi et al., Treatment of antibiotic mycelial fermentation residue: The critical review, Environmental Chemistry, Feb. 2021, p. 459-473, vol. 40, issue 2.
CNIPA, Notification of Third Office Action for CN202311162066.6, May 1, 2024.
South China University of Technology (Applicant), Replacement claims (allowed) of CN202311162066.6, Jun. 14, 2024.
CNIPA, Notification to grant patent right for invention in CN202311162066.6, Jun. 24, 2024.

* cited by examiner

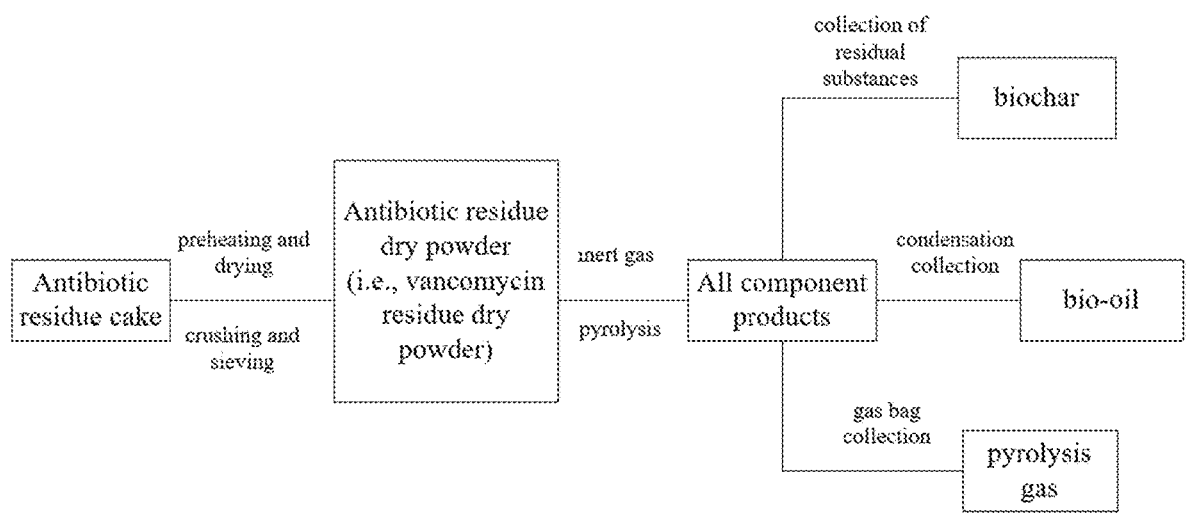

HARMLESS AND RESOURCEFUL TREATMENT METHOD FOR ANTIBIOTIC RESIDUE

CROSS-REFERENCE TO RELATED APPLICATION

This application claims priority to Chinese patent application No. CN 202311162066.6, filed to China National Intellectual Property Administration (CNIPA) on Sep. 11, 2023, which is herein incorporated by reference in its entirety.

TECHNICAL FIELD

The disclosure relates to the technical field of organic solid waste treatment, and particularly to a harmless and resourceful treatment method for antibiotic residue.

BACKGROUND

Antibiotic residue is the waste produced by the pharmaceutical industry during the production process of antibiotics. Its main components include mycelium, metabolic products produced during fermentation, unutilized culture medium, and a small amount of residual antibiotics. The antibiotic residue has a high water content and a high organic matter content, which makes it highly susceptible to decay and producing a foul odor. In addition, if the antibiotics in the antibiotic residue are not safely disposed of and enter the environment, they can easily induce bacteria to develop drug resistance and resistance genes, rendering the antibiotics ineffective and even inducing the emergence of "superbugs", and posing a great threat to the ecological environment and human health.

Currently, the main methods for treating the antibiotic residue include incineration, safe landfilling, composting, anaerobic digestion, and other integrated technologies, but all related arts have certain limitations. The incineration is the most commonly used method by hazardous waste disposal companies and is the most thorough and widely applied treatment technology. However, the water content in the antibiotic residue is generally above 90%, and direct incineration is very costly. In addition, due to the high nitrogen content in the antibiotic residue, which is several to tens of times that of coal, the direct incineration inevitably produces a large amount of toxic and harmful substances such as NOx and dioxins, causing secondary pollution. The antibiotic residue, as hazardous waste, the cost of treating the antibiotic residue by the qualified hazardous waste disposal companies is as high as 2000 to 4000 yuan per ton, which severely restricts the development of pharmaceutical companies. The safe landfilling is just a method of storing the hazardous waste in the soil, and direct safe landfilling has problems such as large land occupation, accumulation of leachate, and the potential for secondary soil pollution. Therefore, how to safely and economically treat the antibiotic residue and convert the antibiotic residue into products is a key focus and urgent problem that enterprises need to solve.

Pyrolysis is a technology that involves heating the antibiotic residue at high temperatures in an oxygen-deficient or anaerobic environment, thereby resulting in the production of biochar, bio-oil, and combustible gases. The antibiotic residue is rich in organic matter such as crude fat, crude protein, and sugars, making it an ideal raw material for the pyrolysis. Through the pyrolysis, the large molecules in the antibiotic residue are broken down into combustible small molecule gases (such as $CO$, $CH_4$, $C_2H_4$, and $H_2$) under the action of thermal reactions. In addition, the high nitrogen content in the antibiotic residue can also produce nitrogen-rich condensable bio-oil during a pyrolysis process. High-value by-products can also be recovered through selective separation and enrichment. The bio-oil collected by condensation, pyrolysis gas, and the residual biochar are also potential recyclable resources. Moreover, the high temperature will destroy the structure of the residual antibiotics in the antibiotic residue, eliminating the residual antibiotics. Therefore, by treating the antibiotic residue with the pyrolysis, it is possible to achieve both harmlessness of the antibiotic residue and the purpose of resource recycling and utilization.

Chinese patent with publication No. CN108455599A discloses a method for preparing micropore-enriched high-performance active carbon from antibiotic residue dry powder. The dry basis of antibiotic residue undergoes $N_2$ atmosphere pyrolysis, alkali solution modification, vacuum drying and baking, and $CO_2$ atmosphere pyrolysis activation, ultimately resulting in activated carbon rich in micropores. Although this disclosure achieves the utilization of activated carbon from the antibiotic residue, the process steps are relatively cumbersome, and it does not clearly state whether the obtained activated carbon has the antibiotic residue, posing the risk of secondary pollution from the residual antibiotics. Chinese patent with publication No. CN114212791A discloses a comprehensive treatment method for resource utilization of antibiotic residue, which specifically includes pyrolyzing antibiotic residue in a specific pyrolysis reactor to obtain pyrolysis gas and pyrolysis carbon. The pyrolysis carbon is then mixed with an activator to place into an activation reactor, while the pyrolysis gas is passed into a heat exchange boiler for combustion and heat exchange. The flue gas that comes out after the heat exchange enters the activation reactor and reacts, ultimately producing activated carbon. However, it also lacks an assessment of the antibiotic residue in the produced activated carbon, and only considers the utilization of the pyrolysis carbon and the pyrolysis gas from the antibiotic residue, and directly burns the pyrolysis gas (without condensation) for heat exchange, which has a low value for resource utilization.

Chinese patent with publication No. CN114276180A discloses a method for preparing nitrogen-containing high-value chemicals by co-pyrolysis of forestry wastes and antibiotic residue, which includes grinding and mixing the forestry wastes and the antibiotic residue in a mass ratio of 1:1 to 1:10, and then co-pyrolyzing them in an oxygen-free environment at temperatures between 450° C. and 750° C. to obtain nitrogen-containing high-value chemicals. The nitrogen-containing high-value chemicals include amides, nitrogen-containing heterocyclic compounds, and nitriles. The method takes advantage of the chemical composition of the antibiotic residue to compensate for the low nitrogen content in the forestry wastes. During the pyrolysis of biomass, the presence of alkali and alkaline earth metal elements such as potassium (K) and calcium (Ca) in agricultural and forestry wastes can significantly alter the distribution of pyrolysis products. The co-pyrolysis of the forestry wastes and the antibiotic residue, through their synergistic effect, can not only increase the yield of nitrogen-containing high-value chemicals but also achieve harmless and resourceful disposal of dangerous chemical antibiotic residue, as well as the resource utilization of agricultural and forestry wastes. Although the method can realize the high-value utilization of the antibiotic residue, it also lacks an assessment of the residual antibiotics in the residual carbon after the pyrolysis, which poses the risk of secondary antibiotic pollution, and it does not fully utilize the components of the antibiotic residue, lacking the utilization of non-condensable pyrolysis gas.

SUMMARY

In response to the shortcomings and deficiencies of the related art, the primary objective of the disclosure is to provide a harmless and resourceful treatment method for antibiotic residue. The method can fully utilize all components of the antibiotic residue. Through pyrolysis treatment, the volatile substances are collected by a condensing device to obtain bio-oil products, and the nitrogen-containing components of the bio-oil products that can be recycled and utilized are recovered as resources. Non-condensable gases are collected as pyrolysis gas, which can also be used for energy utilization. The residual substances after the pyrolysis treatment are the biochar products, which can be utilized for preparing activated carbon or applied to contaminated soil for a soil remediation treatment.

The purpose of the disclosure is achieved through the following technical solutions.

A harmless and resourceful treatment method for antibiotic residue includes steps as follows: Step (1): pre-treatment: drying and crushing the antibiotic residue to obtain a dry powder (also referred to as a dry basis powder) of antibiotic residue; Step (2): pyrolysis reaction: heating the dry powder of antibiotic residue obtained in the step (1) to a temperature of 400-800° C. to thereby perform an isothermal pyrolysis treatment under an inert atmosphere; and Step (3): product collection: collecting, by using a condensing device, condensable gas in volatile substances released during the pyrolysis treatment in the step (2) to obtain a condensable bio-oil product; collecting, by using a gas bag, non-condensable gas in the volatile substances to obtain pyrolysis gas; and collecting residual substances obtained after the pyrolysis treatment as a biochar product.

In an embodiment, the antibiotic residue in the step (1) is a dehydrated and dried antibiotic residue of vancomycin (also referred to as vancomycin residue), with a moisture content in a range of 50% to 80%.

In an embodiment, a content of the vancomycin in the dry powder of antibiotic residue is in a range of 50-300 milligrams per kilogram (mg/kg).

In an embodiment, the drying and crushing the antibiotic residue to obtain a dry powder of antibiotic residue includes: preheating and drying the antibiotic residue at a temperature of 60-105° C. for 12 to 48 hours (h), followed by crushing and sieving the preheated and dried antibiotic residue through a 60 to 100 mesh screen to obtain the dry powder of antibiotic residue.

In an embodiment, in the step (2), a heating rate for the heating is in a range of 5 to 20° C. per minute (° C./min).

In an embodiment, the inert atmosphere in the step (2) is a nitrogen ($N_2$) atmosphere or a carbon dioxide ($CO_2$) atmosphere.

In an embodiment, a time of the isothermal pyrolysis treatment is in a range of 20-120 minutes (min).

In an embodiment, in the step (2), the temperature of the isothermal pyrolysis treatment is 600° C. and the time of the isothermal pyrolysis treatment is 30 min.

In an embodiment, in the step (3), a yield of the condensable bio-oil product is in a range of 15% to 30%, and a yield of the biochar products is in a range of 30% to 50%; a main component of the obtained pyrolysis gas includes at least one selected from the group consisting of $CO_2$, methane ($CH_4$), carbon monoxide (CO), and hydrogen ($H_2$).

In an embodiment, the bio-oil product is further utilized as a chemical crude oil product containing nitrogen; and the biochar product is further utilized for preparing activated carbon or is applied to contaminated soil for a soil remediation treatment.

The principle of the disclosure is as follows.

The disclosure utilizes high-temperature conditions to disrupt the structure of antibiotics in the antibiotic residue, efficiently degrading the residual antibiotics to achieve the harmlessness of the residual antibiotics. In addition, high-temperature conditions can also promote the pyrolysis of large molecular organic matter in the residual antibiotics into volatile organic substances in the gas phase. Through recovering nitrogen-rich bio-oil by condensation, collecting pyrolysis gas with gas bags, and obtaining residual biochar, thereby realizing the full-component utilization of the antibiotic residue.

Compared to the related art, the beneficial effects of the disclosure are as follows.

(1) The disclosure addresses the issues of incomplete degradation of the antibiotic residue, complex processes, high difficulty in resource utilization, and resource wastage in traditional treatments of the antibiotic residue, thereby achieving the goals of harmlessness and full-component resource utilization of the antibiotic residue.

(2) The nitrogen-rich bio-oil obtained by the disclosure can be further purified and separated to prepare high-value nitrogen-containing chemical products. The pyrolysis gas obtained can be reused as a raw material for energy gas, the biochar obtained can be further used for preparing activated carbon or be applied to contaminated soil for a soil remediation treatment, with a high degree of resource utilization and a broad application prospect.

BRIEF DESCRIPTION OF DRAWING

FIGURE illustrates a process flow diagram of a harmless and resourceful treatment method for antibiotic residue in embodiment 1 of the disclosure.

DETAILED DESCRIPTION OF EMBODIMENTS

The following will provide a further detailed description of the disclosure in conjunction with embodiments, but the embodiments of the disclosure are not limited to this.

Embodiment 1

A harmless and resourceful treatment method for antibiotic residue after dehydration and drying in the embodiment, as shown in FIGURE, including the following steps.

(1) Dehydration and drying are performed on a vancomycin residue cake, then the dehydrated and dried vancomycin residue cake is placed in a ventilated drying oven and preheated at 80-85° C. for 48 hours (h). After the preheating, the vancomycin residue cake is crushed and ground, then sifted through a 100-mesh screen to obtain vancomycin residue dry powder. A moisture content of the vancomycin residue cake to be processed after the dehydration and drying is 77.3%, and a moisture content of the preheated vancomycin residue in dry powder is 8.7%. The residual concentration of vancomycin in the vancomycin residue dry powder is 147.8 milligrams per kilogram (mg/kg).

(2) 15 grams of the vancomycin residue dry powder are placed into a tubular furnace pyrolysis reactor, with nitrogen ($N_2$) serving as a carrier gas (i.e., an inert atmosphere) at a flow rate of 250 milliliters per minute (mL/min). A temperature in the tubular furnace pyrolysis reactor is increased at a rate of 10° C. per minute (C/min) up to 600° C., and the temperature is maintained for 30 minutes, thereby obtaining volatile substances and residual substances.

(3) Condensable gas in the volatile substances released from the pyrolysis treatment in the step (2) is collected using a condensing device, thereby to obtain pyrolysis oil (i.e., condensable bio-oil products), with a yield of 23.3%. The relative content of various nitrogen-containing chemicals in the pyrolysis products is analyzed by gas chromatography-mass spectrometry (GC-MS), and it is calculated that the relative content of nitrogen-containing compounds in the pyrolysis products is 59.4%. Specifically, a relative content of indole is 11.4%, a relative content of oleamide is 6.4%, a relative content of 5H-1-4-pyrindine is 0.0%, and a relative content of 2-acetyl-1-methylpyrrole is 3.19%. The pyrolysis gas is collected through gas bags, with a yield of 41.1%, and the main components of the pyrolysis gas are carbon dioxide ($CO_2$) of 23.4%, methane ($CH_4$) of 9.9%, and carbon monoxide (CO) of 2.4%. A yield of biochar is 35.6%. Vancomycin is not detected in the biochar, indicating that the treatment method of the embodiment has achieved complete degradation of the antibiotic residue.

Embodiment 2

A harmless and resourceful treatment method for antibiotic residue after dehydration and drying in the embodiment, as shown in FIGURE, including the following steps.

(1) Dehydration and drying are performed on a vancomycin residue cake, then the dehydrated and dried vancomycin residue cake is placed in a ventilated drying oven and preheated at 80-85° C. for 48 h. After the preheating, the vancomycin residue cake is crushed and ground, then sifted through a 100-mesh screen to obtain vancomycin residue dry powder. A moisture content of the vancomycin residue cake to be processed after dehydration and drying is 77.3%, and a moisture content of the preheated vancomycin residue dry powder is 8.7%. The residual concentration of vancomycin in the vancomycin residue dry powder is 147.8 mg/kg.

(2) 15 grams of the vancomycin residue dry powder are placed into a tubular furnace pyrolysis reactor, with $N_2$ serving as a carrier gas at a flow rate of 250 ml/min. A temperature in the tubular furnace pyrolysis reactor is increased at a rate of 10° C./min up to 700° C., and the temperature is maintained for 30 minutes, thereby obtaining volatile substances and residual substances.

(3) Condensable gas in the volatile substances released from the pyrolysis treatment in the step (2) is collected using a condensing device, thereby to obtain pyrolysis oil (i.e., condensable bio-oil products), with a yield of 24.3%. The relative content of various nitrogen-containing chemicals in the pyrolysis products is analyzed by GC-MS, and it is calculated that the relative content of nitrogen-containing compounds in the pyrolysis products is 55.2%. Specifically, a relative content of indole is 11.5%, a relative content of oleamide is 10.1%, a relative content of 5H-1-4-pyrindine is 0.0%, and a relative content of 2-acetyl-1-methylpyrrole is 3.1%. The pyrolysis gas is collected through gas bags, with a yield of 41.6%, and the main components of the pyrolysis gas are carbon dioxide ($CO_2$) of 22.9%, methane ($CH_4$) of 9.6%, and carbon monoxide (CO) of 2.7%. A yield of biochar is 34.1%. Vancomycin is not detected in the biochar, indicating that the treatment method of the embodiment has achieved complete degradation of the antibiotic residue.

Embodiment 3

A harmless and resourceful treatment method for antibiotic residue after dehydration and drying in the embodiment, as shown in FIGURE, including the following steps.

(1) Dehydration and drying are performed on a vancomycin residue cake, then the dehydrated and dried vancomycin residue cake is placed in a ventilated drying oven and preheated at 80-85° C. for 48 h. After the preheating, the vancomycin residue cake is crushed and ground, then sifted through a 100-mesh screen to obtain a vancomycin residue dry powder. A moisture content of the vancomycin residue cake to be processed after dehydration and drying is 77.3%, and a moisture content of the preheated vancomycin residue dry powder is 8.7%. The residual concentration of vancomycin in the vancomycin residue dry powder is 147.8 mg/kg.

(2) 15 grams of the vancomycin residue dry powder are placed into a tubular furnace pyrolysis reactor, with $N_2$ serving as a carrier gas at a flow rate of 250 ml/min. A temperature in the tubular furnace pyrolysis reactor is increased at a rate of 10° C./min up to 800° C., and the temperature is maintained for 30 minutes, thereby obtaining volatile substances and residual substances.

(3) Condensable gas in the volatile substances released from the pyrolysis treatment in the step (2) is collected using a condensing device, thereby to obtain pyrolysis oil (i.e., condensable bio-oil products), with a yield of 20.5%. The relative content of various nitrogen-containing chemicals in the pyrolysis products is analyzed by GC-MS, and it is calculated that the relative content of nitrogen-containing compounds in the pyrolysis products is 51.4%. Specifically, a relative content of indole is 0.0%, a relative content of oleamide is 4.6%, a relative content of 5H-1-4-pyrindine is 9.9%, and a relative content of 2-acetyl-1-methylpyrrole is 4.2%. The pyrolysis gas is collected through gas bags, with a yield of 46.3%, and the main components of the pyrolysis gas are carbon dioxide ($CO_2$) of 22.5%, methane ($CH_4$) of 10.1%, and carbon monoxide (CO) of 2.8%. A yield of biochar is 33.2%. Vancomycin is not detected in the biochar, indicating that the treatment method of the embodiment has achieved complete degradation of the antibiotic residue.

Embodiment 4

A harmless and resourceful treatment method for antibiotic residue after dehydration and drying in the embodiment, as shown in FIGURE, including the following steps.

(1) Dehydration and drying are performed on a vancomycin residue cake, then the dehydrated and dried vancomycin residue cake is placed in a ventilated drying oven and preheated at 80-85° C. for 48 h. After the preheating, the vancomycin residue cake is crushed and ground, then sifted through a 100-mesh screen to obtain vancomycin residue dry powder. A moisture content of the vancomycin residue cake to be processed after dehydration and drying is 77.3%, and a moisture content of the preheated vancomycin residue dry powder is 8.7%. The residual concentration of vancomycin in the vancomycin residue dry powder is 147.8 mg/kg.

(2) 15 grams of the vancomycin residue dry powder are placed into a tubular furnace pyrolysis reactor, with $CO_2$ serving as a carrier gas at a flow rate of 250 mL/min. A temperature in the tubular furnace pyrolysis reactor is increased at a rate of 10° C./min up to 600° C., and the temperature is maintained for 30 minutes, thereby obtaining volatile substances and residual substances.

(3) Condensable gas in the volatile substances released from the pyrolysis treatment in the step (2) is collected using a condensing device, thereby to obtain pyrolysis oil (i.e., condensable bio-oil products), with a yield of 22.0%. The relative content of various nitrogen-containing chemicals in the pyrolysis products is analyzed by GC-MS, and it is calculated that the relative content of nitrogen-containing compounds in the pyrolysis products is 50.7%. Specifically, a relative content of indole is 0.0%, a relative content of oleamide is 0.0%, a relative content of 5H-1-4-pyrindine is 8.4%, and a relative content of 2-acetyl-1-methylpyrrole is 5.5%. The pyrolysis gas is collected through gas bags, with a yield of 42.7%. After excluding the influence of $CO_2$ carrier gas, the main components of the pyrolysis gas are methane ($CH_4$) of 11.4%, and carbon monoxide (CO) of 2.3%. A yield of biochar is 35.3%. Vancomycin is not detected in the biochar, indicating that the treatment method of the embodiment has achieved complete degradation of the antibiotic residue.

Embodiment 5

A harmless and resourceful treatment method for antibiotic residue after dehydration and drying in the embodiment, as shown in FIGURE, including the following steps.

(1) Dehydration and drying are performed on a vancomycin residue cake, then the dehydrated and dried vancomycin residue cake is placed in a ventilated drying oven and preheated at 80-85° C. for 48 h. After the preheating, the vancomycin residue cake is crushed and ground, then sifted through a 100-mesh screen to obtain vancomycin residue dry powder. A moisture content of the vancomycin residue cake to be processed after dehydration and drying is 77.3%, and a moisture content of the preheated vancomycin residue dry powder is 8.7%. The residual concentration of vancomycin in the vancomycin residue dry powder is 147.8 mg/kg.

(2) 15 grams of the vancomycin residue dry powder are placed into a tubular furnace pyrolysis reactor, with $CO_2$ serving as a carrier gas at a flow rate of 250 mL/min. A temperature in the tubular furnace pyrolysis reactor is increased at a rate of 10° C./min up to 700° C., and the temperature is maintained for 30 minutes, thereby obtaining volatile substances and residual substances.

(3) Condensable gas in the volatile substances released from the pyrolysis treatment in the step (2) is collected using a condensing device, thereby to obtain pyrolysis oil (i.e., condensable bio-oil products), with a yield of 22.8%. The relative content of various nitrogen-containing chemicals in the pyrolysis products is analyzed by GC-MS, and it is calculated that the relative content of nitrogen-containing compounds in the pyrolysis products is 50.8%. Specifically, a relative content of indole is 0.0%, a relative content of oleamide is 0.0%, a relative content of 5H-1-4-pyrindine is 7.9%, and a relative content of 2-acetyl-1-methylpyrrole is 5.9%. The pyrolysis gas is collected through gas bags, with a yield of 43.5%. After excluding the influence of $CO_2$ carrier gas, the main components of the pyrolysis gas are methane ($CH_4$) of 11.3%, and carbon monoxide (CO) of 3.2%. A yield of biochar is 33.7%. Vancomycin is not detected in the biochar, indicating that the treatment method of the embodiment has achieved complete degradation of the antibiotic residue.

Embodiment 6

A harmless and resourceful treatment method for antibiotic residue after dehydration and drying in the embodiment, as shown in FIGURE, including the following steps.

(1) Dehydration and drying are performed on a vancomycin residue cake, then the dehydrated and dried vancomycin residue cake is placed in a ventilated drying oven and preheated at 80-85° C. for 48 h. After the preheating, the vancomycin residue cake is crushed and ground, then sifted through a 100-mesh screen to obtain vancomycin residue dry powder. A moisture content of the vancomycin residue cake to be processed after dehydration and drying is 77.3%, and a moisture content of the preheated vancomycin residue dry powder is 8.7%. The residual concentration of vancomycin in the vancomycin residue dry powder is 147.8 mg/kg.

(2) 15 grams of the vancomycin residue dry powder are placed into a tubular furnace pyrolysis reactor, with $CO_2$ serving as a carrier gas at a flow rate of 250 mL/min. A temperature in the tubular furnace pyrolysis reactor is increased at a rate of 10° C./min up to 800° C., and the temperature is maintained for 30 minutes, thereby obtaining volatile substances and residual substances.

(3) Condensable gas in the volatile substances released from the pyrolysis treatment in the step (2) is collected using a condensing device, thereby to obtain pyrolysis oil (i.e., condensable bio-oil products), with a yield of 22.4%. The relative content of various nitrogen-containing chemicals in the pyrolysis products is analyzed by GC-MS, and it is calculated that the relative content of nitrogen-containing compounds in the pyrolysis products is 48.0%. Specifically, a relative content of indole is 0.0%, a relative content of oleamide is 0.0%, a relative content of 5H-1-4-pyrindine is 8.8%, and a relative content of 2-acetyl-1-methylpyrrole is 5.5%. The pyrolysis gas is collected through gas bags, with a yield of 46.6%. After excluding the influence of $CO_2$ carrier gas, the main components of the pyrolysis gas are methane ($CH_4$) of 10.7%, and carbon monoxide (CO) of 5.9%. A yield of biochar is 31.0%. Vancomycin is not detected in the biochar, indicating that the treatment method of the embodiment has achieved complete degradation of the antibiotic residue.

The above embodiments are the preferred embodiments of the disclosure, but the embodiments of the disclosure are not limited by the above embodiments. Any other changes, modifications, substitutions, combinations, or simplifications that do not deviate from the spirit and principles of the disclosure should be equivalent substitution methods and are included in the scope of protection of the disclosure.

What is claimed is:

1. A harmless and resourceful treatment method for antibiotic residue, comprising:
   step (1), pre-treatment: drying and crushing the antibiotic residue to obtain a dry powder of antibiotic residue;
   step (2), pyrolysis reaction: heating the dry powder of antibiotic residue obtained in the step (1) to a temperature of 400-800° C. to perform an isothermal pyrolysis treatment under an inert a carbon dioxide ($CO_2$) atmosphere; and
   step (3), product collection: collecting, in a condensing device, condensable gas in volatile substances released during the pyrolysis treatment in the step (2) to obtain a condensable bio-oil product; collecting, in a gas bag, non-condensable gas in the volatile substances to obtain pyrolysis gas; and collecting residual substances obtained after the pyrolysis treatment as a biochar product;

wherein the antibiotic residue in the step (1) is a dehydrated and dried antibiotic residue of vancomycin, with a moisture content in a range of 50% to 80%;

wherein in the step (3), a yield of the condensable bio-oil product is in a range of 15% to 30%, and a yield of the biochar product is in a range of 30% to 50%, a component of the condensable bio-oil product comprises 5H-1-pyrindine and 2-acetyl-1-methylpyrrole, and a component of the obtained pyrolysis gas comprises methane ($CH_4$), carbon monoxide (CO); and wherein the bio-oil product is further utilized as a chemical crude oil product containing nitrogen; and the biochar product is further utilized for preparing activated carbon or is applied to contaminated soil for a soil remediation treatment.

2. The harmless and resourceful treatment method as claimed in claim 1, wherein a content of the vancomycin in the dry powder of antibiotic residue is in a range of 50-300 milligrams per kilogram (mg/kg).

3. The harmless and resourceful treatment method as claimed in claim 1, wherein the drying and crushing the antibiotic residue to obtain a dry powder of antibiotic residue comprises:

preheating and drying the antibiotic residue at a temperature of 60-105° C. for 12 to 48 hours (h), followed by crushing and sieving the preheated and dried antibiotic residue through a 60 to 100 mesh screen to obtain the dry powder of antibiotic residue.

4. The harmless and resourceful treatment method as claimed in claim 1, wherein in the step (2), a heating rate for the heating is in a range of 5 to 20° C. per minute (° C./min).

5. The harmless and resourceful treatment method as claimed in claim 1, wherein a time of the isothermal pyrolysis treatment is in a range of 20-120 minutes (min).

6. The harmless and resourceful treatment method as claimed in claim 5, wherein in the step (2), the temperature of the isothermal pyrolysis treatment is 600° C. and the time of the isothermal pyrolysis treatment is 30 min.

* * * * *